United States Patent Office 2,792,365
Patented May 14, 1957

2,792,365

PROCESS FOR BREAKING PETROLEUM EMULSIONS EMPLOYING CERTAIN AMINE-MODIFIED THERMOPLASTIC PHENOL - ALDEHYDE RESINS

Melvin De Groote, University City, Mo., assignor to Petrolite Corporation, Wilmington, Del., a corporation of Delaware No Drawing. Application August 24, 1953,
Serial No. 376,240

10 Claims. (Cl. 252—344)

Attention is directed to my co-pending application, Serial No. 288,743, filed May 19, 1952, now abandoned. Said co-pending application relates to a process of condensing certain phenol-aldehyde resins, therein described in detail, with a basic hydroxylated secondary monoamine, having not more than 32 carbon atoms in any group attached to the amino nitrogen atom, and formaldehyde.

Condensates obtained from phenol-aldehyde resins and alkanol amines are invariably and inevitably oxyalkylation-susceptible by virtue of the presence of at least some phenolic hydroxyls and presumably by the presence of at least some alkanol radicals. Indeed, the most valuable derivatives of which I am aware are those obtained by the action of monoepoxides, such as ethylene oxide, propylene oxide, butylene oxide, glycide and methylglycide on the condensates herein described, in the ratio of one to ten times the amount of oxide by weight of condensate. Such oxyalkylated derivatives are of outstanding value for the resolution of petroleum emulsions of the water-in-oil type.

As pointed out hereinafter, when prepared as herein described the condensates may at times slowly lose formaldehyde when heated at the maximum reaction temperature for a considerable period of time. However, they are heat-stable in the usual sense of the word.

In the present instance, the proviso that "the resinous condensation product resulting from the process be heat-stable and oxyalkylation-susceptible" is eliminated from the claims except it obviously characterizes an intermediate condensate. Note that such qualification does characterize even the final product but is simply omitted to avoid any possible conflict with what is said subsequently as to the elimination of formaldehyde.

Primarily, the products herein described are comparable to the products described in my aforementioned copending application, Serial No. 288,743, insofar that they are organic solvent-soluble, i. e., dissolve in hydrocarbons or hydroxylated solvents, such as alcohols, particularly higher alcohols, in ethers, glycols, glycol ethers, and the like. The characterization "organic solvent-soluble" is intended to characterize the materials as being soluble as differentiated from insoluble resins. However, in such instances when the ultimate condensation product is obtained by a two-step process and the first step results in an intermediate condensate such as that described in my copending application, Serial No. 288,743, I have employed the terminology of said copending application, i. e., "heat-stable and oxyalkylation-susceptible" to characterize the intermediate condensate, for the reason that, as far as I know, the intermediate type of condensate does not yield formaldehyde on heating and thus is heat-stable.

The present invention is differentiated from said prior invention in that although the same reactants are employed, instead of being employed within the ratio of 1:2:2 the ratio varies from 1:3:3 to 1:4:4 and even up to 1:5:5. This change in reactant ratio results in the formation of more complex and more complicated condensation products which, in turn, are more valuable, at least in a number of cases, than the particular condensates described in said aforementioned co-pending application, Serial No. 288,743.

As a matter of fact, condensates derived in the manner described in the above mentioned co-pending application, Serial No. 288,743, may be reacted further with an additional amount of formaldehyde and hydroxylated secondary amine to produce the type of material herein specified, or if desired, the reactants may be combined in the ultimate proportion at the very beginning of the reaction; or, for that matter, a second intermediate may be produced and this particular intermediate combined with a product of the kind described in aforementioned Serial No. 288,743.

Anyone of three methods of manufacture can be employed and all will be described in greater detail subsequently. My preference is to prepare the product as described in Serial No. 288,743 and then combine it additionally with one to two moles of added secondary hydroxylated amine and at least an equimolar proportion of formaldehyde, based on the amine added at the second stage.

Reference is again made to U. S. Patent No. 2,499,368 dated March 7, 1950, to De Groote and Keiser. Attention is directed to that part of the text which appears in columns 28 and 29, lines 12 through 75, and lines 1 through 21, respectively. Reference is made to this test with the same force and effect as if it were herein included. This, in essence, means that the preferred product for resolution of petroleum emulsions of the water-in-oil type is characterized by the fact that a 50–50 solution in xylene, or its equivalent, when mixed with one to three volumes of water and shaken will produce an emulsion.

For purpose of convenience, what is said hereinafter will be divided into four parts:

Part 1 is concerned with the phenol-aldehyde resin which is subjected to modification by condensation reaction to yield an amine-modified resin;

Part 2 is concerned with appropriate basic hydroxylated secondary monoamines which may be employed in the preparation of the herein described amine-modified resins;

Part 3 is concerned with reactions involving the resin, the amine, and formaldehyde to produce specific products or compounds;

Part 4 is concerned with uses for the products described in Part Three, preceding, for the resolution of petroleum emulsions.

PART 1

It is well known that one can readily purchase on the open market, or prepare, fusible, organic solvent-soluble, water-insoluble resin polymers of a composition approximated in an idealized form by the formula

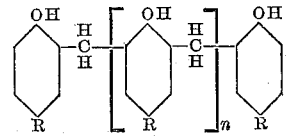

In the above formula $n$ represents a small whole number varying from 1 to 6, 7 or 8, or more, up to probably 10 or 12 units, particularly when the resin is subjected to heating under a vacuum as described in the literature. A limited sub-genus is in the instance of low molecular weight polymers where the total number of phenol nuclei varies from 3 to 6, i. e., $n$ varies from 1 to 4; R represents an aliphatic hydrocarbon substitutent, generally an alkyl radical having from 4 to 15 carbon atoms, such as a butyl, amul, hexyl, decyl or dodecyl radical. Where the divalent bridge radical is shown as being derived from formaldehyde it may, of course, be derived from any other reactive aldehyde having 8 carbon atoms or less.

Because a resin is organic solvent-soluble does not mean it is necessarily soluble in any organic solvent. This is particularly true where the resins are derived from trifunctional phenols as previously noted. However, even when obtained from a difunctional phenol, for instance, paraphenylphenol, one may obtain a resin which is not soluble in a nonoxygenated solvent, such as benzene, or xylene, but requires an oxygenated solvent such as a low molal alcohol, dioxane, or diethyleneglycol diethylethere. Sometimes a mixture of the two solvents (oxygenated and nonoxygenated) will serve. See Example 9a of U. S. Patent No. 2,499,365, dated March 7, 1950, to De Groote and Keiser.

The resins herein employed as raw materials must be soluble in a nonoxygenated solvent, such as benzene or xylene. This presents no problem insofar that all that is required is to make a solubility test on commercially available resins, or else prepare resins which are xylene or benzene-soluble as described in aforementioned U. S. Patent No. 2,499,365, or in U. S. Patent No. 2,499,368, dated March 7, 1950, to De Groote and Keiser. In said patent there are described oxyalkylation-susceptible, fusible, nonoxygenated-organic solvent-soluble, water insoluble, low-stage phenol-aldehyde resins having an average molecular weight corresponding to at least 3 and not over 6 phenolic nuclei per resin molecule. These resins are difunctional only in regard to methylol-forming reactivity, are derived by reaction between a difunctional monohydric phenol and an aldehyde having not over 8 carbon atoms and reactive toward said phenol and are formed in the substantial absence of trifunctional phenols. The phenol is of the formula

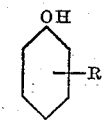

in which R is an aliphatic hydrocarbon radical having at least 4 carbon atoms and not more than 24 carbon atoms, and substituted in the 2,4,6 position.

If one selected a resin of the kind just described previously and reacted approximately one mole of the resin with two moles of formaldehyde and two moles of a basic nonhydroxylated secondary amine as specified, following the same idealized over-simplification previously referred to, the resultant product might be illustrated thus:

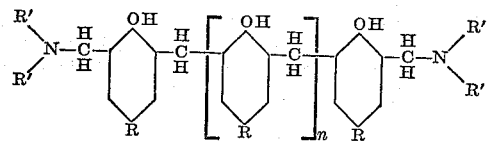

The basic nonhydroxylated amine may be designed thus:

In conducting reactions of this kind one does not necessarily obtain a hundred percent yield for obvious reasons. Certain side reactions may take place. For instance, 2 moles of amine may combine with one mole of the aldehyde, or only one mole of the amine may combine with the resin molecule, or even to a very slight extent, if at all, 2 resin units may combine without any amine in the reaction product, as indicated in the following formulas:

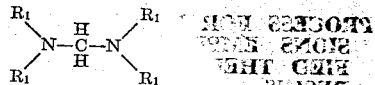

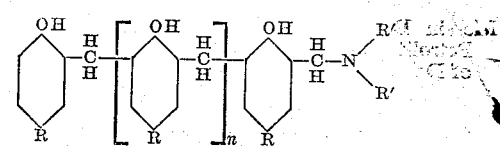

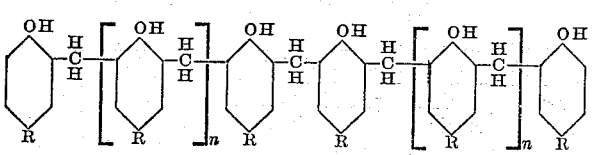

As has been pointed out previously, as far as the resin unit goes one can use a mole of aldehyde other than formaldehyde, such as acetaldehyde, propionaldehyde or butyraldehyde. The resin unit may be exemplified thus:

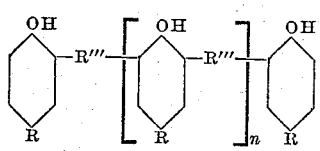

in which R''' is the divalent radical obtained from the particular aldehyde employed to form the resin. For reasons which are obvious the condensation product obtained appears to be described best in terms of the method of manufacture.

As previously stated the preparation of resins, the kind herein employed as reactants, is well known. See previously mentioned U. S. Patent 2,499,368. Resins can be made using an acid catalyst or basic catalyst or a catalyst having neither acid nor basic properties in the ordinary sense or without any catalyst at all. It is preferable that the resins employed be substantially neutral. In other words, if prepared by using a strong acid as a catalyst such strong acid should be neutralized. Similarly, if a strong base is used as a catalyst it is preferable that the base be neutralized although we have found that sometimes the reaction described proceeded more rapidly in the presence of a small amount of a free base. The amount may be as small as a 200th of a percent and as much as a few 10ths of a percent. Sometimes moderate increase in caustic soda and caustic potash may be used. However, the most desirable procedure in practically every case is to have the resin neutral.

In preparing resins one does not get a single polymer, i. e., one having just 3 units, or just 4 units, or just 5 units, or just 6 units, etc. It is usually a mixture; for instance, one approximating 4 phenolic nuclei will have some trimer and pentamer present. Thus, the molecular weight may be such that it corresponds to a fractional value for n as, for example, 3.5, 4.5 or 5.2.

In the actual manufacture of the resins we found no reason for using other than those which are lowest in price and most readily available commercially. For purposes of convenience suitable resins are characterized in the following table:

TABLE I

| Ex. ample number | R | Position of R | R''' derived from— | n | Mol. wt. of resin molecule (based on n+2) |
|---|---|---|---|---|---|
| 1a | Phenyl | Para | Formaldehyde | 3.5 | 992.5 |
| 2a | Tertiary butyl | do | do | 3.5 | 882.5 |
| 3a | Secondary butyl | Ortho | do | 3.5 | 882.5 |
| 4a | Cyclohexyl | Para | do | 3.5 | 1,025.5 |
| 5a | Tertiary amyl | do | do | 3.5 | 959.5 |
| 6a | Mixed secondary and tertiary amyl | Ortho | do | 3.5 | 805.5 |
| 7a | Propyl | Para | do | 3.5 | 805.5 |
| 8a | Tertiary hexyl | do | do | 3.5 | 1,036.5 |
| 9a | Octyl | do | do | 3.5 | 1,190.5 |
| 10a | Nonyl | do | do | 3.5 | 1,267.5 |
| 11a | Decyl | do | do | 3.5 | 1,344.5 |
| 12a | Dodecyl | do | do | 3.5 | 1,498.5 |
| 13a | Tertiary butyl | do | Acetaldehyde | 3.5 | 945.5 |
| 14a | Tertiary amyl | do | do | 3.5 | 1,022.5 |
| 15a | Nonyl | do | do | 3.5 | 1,330.5 |
| 16a | Tertiary butyl | do | Butyraldehyde | 3.5 | 1,071.5 |
| 17a | Tertiary amyl | do | do | 3.5 | 1,148.5 |
| 18a | Nonyl | do | do | 3.5 | 1,456.5 |
| 19a | Tertiary butyl | do | Propionaldehyde | 3.5 | 1,008.5 |
| 20a | Tertiary amyl | do | do | 3.5 | 1,085.5 |
| 21a | Nonyl | do | do | 3.5 | 1,393.5 |
| 22a | Tertiary butyl | do | Formaldehyde | 4.2 | 996.6 |
| 23a | Tertiary amyl | do | do | 4.2 | 1,083.4 |
| 24a | Nonyl | do | do | 4.2 | 1,430.6 |
| 25a | Tertiary butyl | do | do | 4.8 | 1,094.4 |
| 26a | Tertiary amyl | do | do | 4.8 | 1,189.6 |
| 27a | Nonyl | do | do | 4.8 | 1,570.4 |
| 28a | Tertiary amyl | do | do | 1.5 | 604.0 |
| 29a | Cyclohexyl | do | do | 1.5 | 646.0 |
| 30a | Hexyl | do | do | 1.5 | 653.0 |
| 31a | do | do | Acetaldehyde | 1.5 | 688.0 |
| 32a | Octyl | do | do | 1.5 | 786.0 |
| 33a | Nonyl | do | do | 1.5 | 835.0 |
| 34a | Octyl | do | Butyraldehyde | 2.0 | 986.0 |
| 35a | Nonyl | do | do | 2.0 | 1,028.0 |
| 36a | Amyl | do | do | 2.0 | 860.0 |
| 37a | Butyl | do | Formaldehyde | 2.0 | 636.0 |
| 38a | Amyl | do | do | 2.0 | 692.0 |
| 39a | Hexyl | do | do | 2.0 | 748.0 |
| 40a | Cyclohexyl | do | do | 2.0 | 740.0 |

PART 2

As has been pointed out previously the amine herein employed as a reactant is a basic hydroxylated secondary monoamine whose composition is indicated thus:

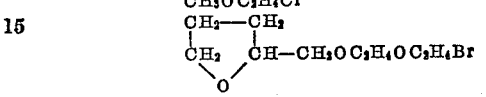

in which R' represents a monovalent alkyl, alicyclic, arylalkyl radical which may be heterocyclic in a few instances as in a secondary amine derived from furfurylamine by reaction as ethylene oxide or propylene oxide. Furthermore, at least one of the radicals designed by R' must have at least one hydroxyl radical. A large number of secondary amines are available and may be suitably employed as reactants for the present purpose. Among others, one may employ diethanolamine, methyl ethanolamine, dipropanolamine and ethylpropanolamine. Other suitable secondary amines are obtained, of course, by taking any suitable primary amine, such as an alkylamine, an arylalkylamine, or an alicyclic amine, and treating the amine with one mole of an oxyalkylating agent, such as ethylene oxide, propylene oxide, butylene oxide, glycide, or methylglycide. Suitable primary amines which can be so converted into secondary amines, include butylamine, amylamine, hexylamine, higher molecular weight amines derived from fatty acids, cyclohexylamine, benzylamine, furfurylamine, etc. In other instances secondary amines which have at least one hydroxyl radical can be treated similarly with an oxyalkylating agent, or, for that matter, with an alkylating agent such as benzyl chloride, esters of chloroacetic acid, alkyl bromides, dimethylsulfate, esters of sulfonic acid, etc., so as to convert the primary amine into a secondary amine. Among others, such amines include 2 - amino - 1 - butanol, 2-amino - 2 - methyl - 1 - propanol, 2 - amino - 2 - methyl-1 - 3 - propanediol, 2 - amino - 2 - ethyl - 1,3 - propanediol, and tri(hydroxymethyl) - aminomethane. Another example of such amines is illustrated by 4 - amino - 4 - methyl - 2 - pentanol.

Similarly, one can prepare suitable secondary amines which have not only a hydroxyl group but also one or more divalent oxygen linkages as part of an ether radical. The preparation of such amines or suitable reactants for preparing them has been described in the literature and particularly in two United States patents, to wit, U. S. Patents Nos. 2,325,514, dated July 27, 1943, to Hester, and 2,355,337 dated August 8, 1944, to Spence. The latter patent describes typical haloalkyl ethers such as $CH_3OC_2H_4Cl$

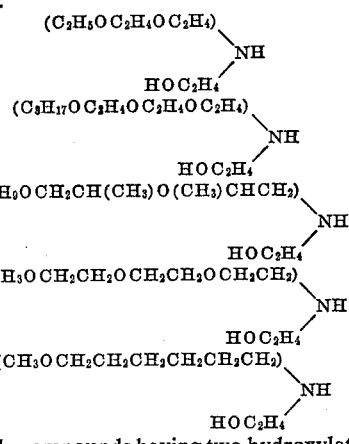

$C_2H_5OC_2H_4OC_2H_4OC_2H_4Cl$

Such haloalkyl ethers can be reacted with ammonia or with a primary amine, such as ethanolamine, propanolamine, monoglycerylamine, etc., to produce a secondary amine in which there is not only present a hydroxyl radical but a repetitious ether linkage. Compounds can be readily obtained which are exemplified by the following formulas:

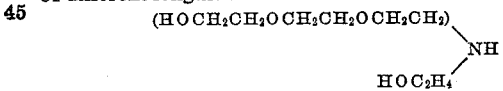

$$(C_2H_5OC_2H_4OC_2H_4) \atop HOC_2H_4 \diagdown NH \diagup$$

$$(C_8H_{17}OC_2H_4OC_2H_4OC_2H_4) \atop HOC_2H_4 \diagdown NH \diagup$$

$$(C_4H_9OCH_2CH(CH_3)O(CH_3)CHCH_2) \atop HOC_2H_4 \diagdown NH \diagup$$

$$(CH_3OCH_2CH_2OCH_2CH_2OCH_2CH_2) \atop HOC_2H_4 \diagdown NH \diagup$$

$$(CH_3OCH_2CH_2CH_2CH_2CH_2CH_2) \atop HOC_2H_4 \diagdown NH \diagup$$

or comparable compounds having two hydroxylated groups of different lengths as in $$(HOCH_2CH_2OCH_2CH_2OCH_2CH_2) \atop HOC_2H_4 \diagdown NH \diagup$$

Other examples of suitable amines include alpha-methylbenzylamine and monoethanolamine; also amines obtained by treating cyclohexylmethylamine with one mole of an oxyalkylating agent as previously described; beta-ethylhexyl-butanolamine, diglycerylamine, etc. Another type of amines which is of particular interest because it includes a very definite hydrophile group includes sugar amines such as glucamine, galactamine and fructamine, such as N-hydroxyethylglucamine, N-hydroxyethylglactamine, and N-hydroxyethylfructamine.

Other suitable amines may be illustrated by

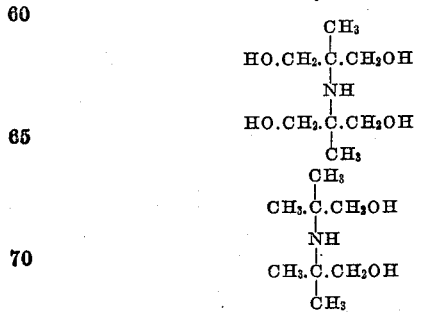

See, also, corresponding hydroxylated amines which can be obtained from rosin or similar raw materials and described in U. S. Patent No. 2,510,063, dated June 6, 1950, to Brief. Still other examples are illustrated by treatment of certain secondary amines, such as the following, with a mole of an oxyalkylating agent as described; phenoxyethylamine, phenoxypropylamine, phenoxyalphamethylethylamine, and phenoxypropylamine.

Other procedures for production of suitable compounds having a hydroxyl group and a single basic amino-nitrogen atom can be obtained from any suitable alcohol or the like by reaction with a reagent which contains an epoxide group and a secondary amine group. Such reactants are described, for example, in U. S. Patents Nos. 1,977,251 and 1,977,253, both dated October 16, 1934, to Stallmann. Among the reactants described in said latter patent are the following:

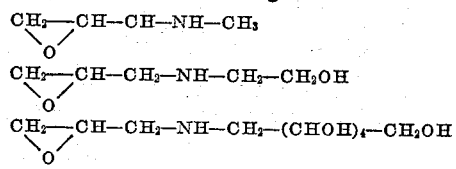

PART 3

The products obtained by the herein described processes represent cogeneric mixtures which are the result of a condensation reaction or reactions. Since the resin molecule cannot be defined satisfactorily by formula, although it may be so illustrated in an idealized simplification, it is difficult to actually depict the final product of the cogeneric mixture except in terms of the process itself.

Previous reference has been made to the fact that the procedure herein employed is comparable, in a general way, to that which corresponds to somewhat similar derivatives made either from phenols as differentiated from a resin, or in the manufacture of a phenol-amine-aldehyde resin; or else from a particularly selected resin and an amine and formaldehyde in the manner described in Bruson Patent No. 2,031,557 in order to obtain a heat-reactive resin. Since the condensation products obtained are not heat-convertible and since manufacture is not restricted to a single phase system, and since temperatures up to 150° C. or thereabouts may be employed, it is obvious that the procedure becomes comparatively simple. Indeed, perhaps no description is necessary over and above what has been said previously, in light of subsequent examples. However, for purpose of clarity the following details are included.

A convenient piece of equipment for preparation of these cogeneric mixtures is a resin pot of the kind described in aforementioned U. S. Patent No. 2,499,368. In most instances the resin selected is not apt to be a fusible liquid at the early or low temperature stage of reaction if employed as subsequently described; in fact, usually it is apt to be a solid at distinctly higher temperatures, for instance, ordinary room temperature. Thus, we have found it convenient to use a solvent and particularly one which can be removed readily at a comparatively moderate temperature, for instance, at 150° C. A suitable solvent is usually benzene, xylene, or a comparable petroleum hydrocarbon or a mixture of such or similar solvents. Indeed, resins which are not soluble except in oxygenated solvents or mixtures containing such solvents are not here included as raw materials. The reaction can be conducted in such a way that the initial reaction, and perhaps the bulk of the reaction, takes place in a polyphase system. However, if desirable, one can use an oxygenated solvent such as a low-boiling alcohol, including ethyl alcohol, methyl alcohol, etc. Higher alcohols can be used or one can use a comparatively non-volatile solvent such as dioxane or the diethyl-ether or ethyleneglycol. One can also use a mixture of benzene or xylene and such oxygenated solvents. Note that the use of such oxygenated solvent is not required in the sense that it is not necessary to use an initial resin which is soluble only in an oxygenated solvent as just noted, and it is not necessary to have a single phase system for reaction.

Actually, water is apt to be present as a solvent for the reason that in most cases aqueous formaldehyde is employed, which may be the commercial product which is approximately 37%, or it may be diluted down to about 30% formaldehyde. However, paraformaldehyde can be used but it is more difficult perhaps to add a solid material instead of the liquid solution and, everything else being equal, the latter is apt to be more economical. In any event, water is present as water of reaction. If the solvent is completely removed at the end of the process, no problem is involved if the material is used for any subsequent reaction. However, if the reaction mass is going to be subjected to some further reaction where the solvent may be objectionable as in the case of ethyl or hexyl alcohol, and if there is to be subsequent oxyalkylation, then, obviously, the alcohols should not be used or else it should be removed. The fact that an oxygenated solvent need not be employed, of course, is an advantage for reasons stated.

Another factor, as far as the selection of solvent goes, is whether or not the cogeneric mixture obtained at the end of the reaction is to be used as such or in the salt form. The cogeneric mixtures obtained are apt to be solids or thick viscous liquids in which there is some change from the initial resin itself, particularly if some of the initial solvent is apt to remain without complete removal. Even if one starts with a resin which is almost water-white in color, the products obtained are almost invariably a dark red in color or at least a red-amber, or some color which includes both an amber component and a reddish component. By and large, the melting point is apt to be lower and the products may be more sticky and more tacky than the original resin itself. Depending on the resin selected and on the amine selected the condensation product or reaction mass on a solvent-free basis may be hard, resinous and comparable to the resin itself.

The products obtained, depending on the reactants selected, may be water-insoluble, or water-dispersible, or water-soluble, or close to being water-soluble. Water solubility is enhanced, of course, by making a solution in the acidified vehicle such as a dilute solution, for instance, a 5% solution of hydrochloric acid, acetic acid, hydroxyacetic acid, etc. One also may convert the finished product into salts by simply adding a stoichiometric amount of any selected acid and removing any water present by refluxing with benzene or the like. In fact, the selection of the solvent employed may depend in part whether or not the product at the completion of the reaction is to be converted into a salt form.

In the next succeeding paragraph it is pointed out that frequently it is convenient to eliminate all solvent, using a temperature of not over 150° C. and employing vacuum, if required. This applies, of course, only to those circumstances where it is desirable or necessary to remove the solvent. Petroleum solvents, aromatic solvents, etc., can be used. The selection of solvent, such as benzene, xylene, or the like, depends primarily on cost, i. e., the use of the most economical solvent and also on three other factors, two of which have been previously mentioned; (a) is the solvent to remain in the reaction mass without removal? (b) is the reaction mass to be subjected to further reaction in which the solvent, for instance, an alcohol either low boiling or high boiling, might interfere as in the case of oxyalkylation?; and the third factor is this, (c) is an effort to be made to purify the reaction mass by the usual procedure as, for example, a water-wash to remove any unreacted low molal soluble amine, if employed and present after reaction? Such procedures are well known and, needless to say, certain solvents are more suitable than others. Everything else being equal, we have found xylene the most satisfactory solvent.

We have found no particular advantage in using a low temperature in the early stage of the reaction because, and for reasons explained, this is not necessary although it does apply in some other procedures that, in a general way, bear some similarity to the present procedure. There is no objection, of course, to giving the reaction an opportunity to proceed as far as it will at some low temperature, for instance 30° to 40° but ultimately one must employ the higher temperature in order to obtain products of the kind herein described. If a lower temperature reaction is used initially the period is not critical, in fact, it may be anything from a few hours up to 24 hours. We have not found any case where it was necessary or even desirable to hold the low temperature stage for more than 24 hours. In fact, we are not convinced there is any advantage in holding it at this stage for more than 3 or 4 hours at the most. This, again, is a matter of convenience largely for one reason. In heating and stirring the reaction mass there is a tendency for formaldehyde to be lost. Thus, if the reaction can be conducted at a lower temperature, then the amount of unreacted formaldehyde is decreased subsequently and makes it easier to prevent any loss. Here, again, this lower temperature is not necessary by virtue of heat convertibility as previously referred to.

If solvents and reactants are selected so the reactants and products of reaction are mutually soluble, then agitation is required only to the extent that it helps cooling or helps distribution of the incoming formaldehyde. This mutual solubility is not necessary as previously pointed out but may be convenient under certain circumstances. On the other hand, if the products are not mutually soluble then agitation should be more vigorous for the reason that reaction probably takes place principally at the interfaces and the more vigorous the agitation the more interfacial area. The general procedure employed is invariably the same when adding the resin and the selected solvent, such as benzene or xylene. Refluxing should be long enough to insure that the resin added, preferably in a powdered form, is completely soluble. However, if the resin is prepared as such it may be added in solution form, just as preparation is described in aforementioned U. S. Patent 2,499,368. After the resin is in complete solution the amine is added and stirred. Depending on the amine selected, it may or may not be soluble in the resin solution. If it is not soluble in the resin solution it may be soluble in the aqueous formaldehyde solution. If so, the resin then will dissolve in the formaldehyde solution as added, and if not, it is even possible that the initial reaction mass could be a three-phase system instead of a two-phase system although this would be extremely unusual. This solution, or mechanical mixture, if not completely soluble is cooled to at least the reaction temperature or somewhat below, for example, 35° C. or slightly lower, provided this initial low temperature stage is employed. The formaldehyde is then added in a suitable form. For reasons pointed out we prefer to use a solution and whether to use a commerical 37% concentration is simply a matter of choice. In large scale manufacturing there may be some advantage in using a 30% solution of formaldehyde but apparently this is not true on a small laboratory scale or pilot plant scale. 30% formaldehyde may tend to decrease any formaldehyde loss or make it easier to control unreacted formaldehyde loss.

On a large scale if there is any difficulty with formaldehyde loss control, one can use a more dilute form of formaldehyde, for instance, a 30% solution. The reaction can be conducted in an autoclave and no attempt made to remove water until the reaction is over. Generally speaking, such a procedure is much less satisfactory for a number of reasons. For example, the reaction does not seem to go to completion, foaming takes place, and other mechanical or chemical difficulties are involved. We have found no advantage in using solid formaldehyde because even here water of reaction is formed.

Returning again to the preferred method of reaction and particularly from the standpoint of laboratory procedure employing a glass resin pot, when the reaction has proceeded as one can reasonably expect at a low temperature, for instance, after holding the reaction mass with or without stirring, depending on whether or not it is homogeneous, at 30° or 40° C., for 4 or 5 hours, or at the most, up to 10–24 hours, we then complete the reaction by raising the temperature up to 150° C., or thereabouts as required. The initial low temperature procedure can be eliminated or reduced to merely the shortest period of time which avoids loss of amine or formaldehyde. At a higher temperature we use a phase-separating trap and subject the mixture to reflux condensation until the water of reaction and the water of solution of the formaldehyde is eliminated. We then permit the temperature to rise to somewhere about 100° C., and generally slightly above 100° C., and below 150° C., by eliminating the solvent or part of the solvent so the reaction mass stays within this predetermined range. This period of heating and refluxing, after the water is eliminated is continued until the reaction mass is homogeneous and then for one to three hours longer. The removal of the solvents is conducted in a conventional manner in the same way as the removal of solvents in resin manufacture as described in aforementioned U. S. Patent No. 2,499,368.

Needless to say, as far as the ratio of reactants goes we have invariably employed approximately one mole of the resin based on the molecular weight of the resin molecule, 2 moles of the secondary amine and 2 moles of formaldehyde. In some instances we have added a trace of caustic as an added catalyst but have found no particular advantage in this. In other cases we have used a slight excess of formaldehyde and, again, have not found any particular advantage in this. In other cases we have used a slight excess of amine and, again, have not found any particular advantage in so doing. Whenever feasible we have checked the completeness of reaction in the usual ways, including the amount of water of reaction, molecular weight, and particularly in some instances have checked whether or not the end-product showed surface-activity, particularly in a dilute acetic acid solution. The nitrogen content after removal of unreacted amine, if any is present, is another index.

In light of what has been said previously, little more need be said as to the actual procedure employed for the preparation of the herein described condensation products. The following example will serve by way of illustration.

*Example 1b*

The phenol-aldehyde resin is the one that has been identified previously as Example 2a. It was obtained from a para-tertiary butylphenol and formaldehyde. The resin was prepared using an acid catalyst which was completely neutralized at the end of the reaction. The molecular weight of the resin was 882.5. This corresponded to an average of about 3½ phenolic nuclei, as the value for $n$ which excludes the 2 external nuclei, i. e., the resin was largely a mixture having 3 nuclei and 4 nuclei, excluding the 2 external nuclei, or 5 and 6 overall nuclei. The resin so obtained in a neutral state had a light amber color.

882 grams of the resin identified as 2a preceding were powdered and mixed with 700 grams of xylene. The mixture was refluxed until solution was complete. It was then adjusted to approximately 30° to 35° C. and 210 grams of diethanolamine added. The mixture was stirred vigorously and formaldehyde added slowly. The formaldehyde used was a 37% solution and 160 grams were employed which were added in about 3 hours. The mixture was stirred vigorously and kept within a temperature range of 30° to 45° C. for about 21 hours. At the end of this period of time it was refluxed, using a phase-separating trap and a small amount of aqueous distillate withdrawn from time to time and the presence of unreacted formaldehyde noted. Any unreacted formaldehyde seemed to disappear within approximately 3 hours after the refluxing was started. As soon as the odor of formaldehyde was no longer detectible the phase-separating trap was set so as to eliminate all water of solution and reaction. After the water was eliminated part of the xylene was removed until the temperature reached about 150° C. The mass was kept at this higher temperature for about 3¾ hours and reaction stopped. During this time any additional water, which was probably water of reaction which had formed, was eliminated by means of the trap. The residual xylene was permitted to stay in the cogeneric mixture. A small amount of the sample was heated on a water bath to remove the excess xylene and the residual material was dark red in color and had the consistency of a sticky fluid or a tacky resin. The overall reaction time was a little over 30 hours.

In other instances it has varied from approximately 24 to 36 hours. The time can be reduced by cutting the low temperature period to about 3 to 6 hours.

Note that in Table II following there are a large number of added examples illustrating the same procedure. In each case the initial mixture was stirred and held at a fairly low temperature (30° to 40° C.) for a period of several hours. Then refluxing was employed until the odor of formaldehyde disappeared. After the odor of formaldehyde disappeared the phase-separating trap was employed to separate out all the water both the solution and condensation. After all the water had been separated enough xylene was taken out to have the final product reflux for several hours somewhere in the range of 145° to 150° C. or thereabouts. Usually the mixture yielded a clear solution by the time the bulk of the water, or all of the water, had been removed.

Note that as pointed out previously, this procedure is illustrated by 24 examples in Table II.

TABLE II

| Ex. No. | Resin used | Amt., grs. | Amine used and amount | Strength of formaldehyde soln. and amt. | Solvent used and amt. | Reaction temp., °C. | Reaction time, (hrs.) | Max. distill. temp., °C. |
|---|---|---|---|---|---|---|---|---|
| 1b | 2a | 882 | Diethanolamine, 210 g | 37%, 162 g | Xylene, 700 g | 22–26 | 32 | 137 |
| 2b | 5a | 480 | Diethanolamine, 105 g | 37%, 81 g | Xylene, 450 g | 21–23 | 28 | 150 |
| 3b | 10a | 633 | ...do... | ...do... | Xylene, 600 g | 20–22 | 36 | 145 |
| 4b | 2a | 441 | Dipropanolamine, 133 g | 30%, 100 g | Xylene, 400 g | 20–23 | 34 | 146 |
| 5b | 5a | 480 | ...do... | ...do... | Xylene, 450 g | 21–23 | 24 | 141 |
| 6b | 10a | 633 | ...do... | ...do... | Xylene, 600 g | 21–28 | 24 | 145 |
| 7b | 2a | 882 | Ethylethanolamine, 178 g | 37%, 162 g | Xylene, 700 g | 20–26 | 24 | 152 |
| 8b | 5a | 480 | Ethylethanolamine, 89 g | 37%, 81 g | Xylene, 450 g | 24–30 | 28 | 151 |
| 9b | 10a | 633 | ...do... | ...do... | Xylene, 600 g | 22–25 | 27 | 147 |
| 10b | 13a | 473 | Cyclohexylethanolamine, 143 g | 30%, 100 g | Xylene, 450 g | 21–31 | 31 | 146 |
| 11b | 14a | 511 | ...do... | 37%, 81 g | ...do... | 22–23 | 36 | 148 |
| 12b | 15a | 665 | ...do... | ...do... | Xylene, 550 g | 20–24 | 27 | 152 |
| 13b | 2a | 441 | $C_2H_5OC_2H_4OC_2H_4$<br>$\diagdown$<br>NH, 176 g<br>$\diagup$<br>$HOC_2H_4$ | ...do... | Xylene, 400 g | 21–25 | 24 | 150 |
| 14b | 5a | 480 | $C_2H_5OC_2H_4OC_2H_4$<br>$\diagdown$<br>NH, 176 g<br>$\diagup$<br>$HOC_2H_4$ | ...do... | Xylene, 450 g | 20–26 | 26 | 146 |
| 15b | 9a | 595 | $C_2H_5OC_2H_4OC_2H_4$<br>$\diagdown$<br>NH, 176 g<br>$\diagup$<br>$HOC_2H_4$ | ...do... | Xylene, 550 g | 21–27 | 30 | 147 |
| 16b | 2a | 441 | $HOC_2H_4OC_2H_4OC_2H_4$<br>$\diagdown$<br>NH, 192 g<br>$\diagup$<br>$HOC_2H_4$ | ...do... | Xylene, 400 g | 20–22 | 30 | 148 |
| 17b | 5a | 480 | $HOC_2H_4OC_2H_4OC_2H_4$<br>$\diagdown$<br>NH, 192 g<br>$\diagup$<br>$HOC_2H_4$ | ...do... | ...do... | 20–25 | 28 | 150 |
| 18b | 14a | 511 | $HOC_2H_4OC_2H_4OC_2H_4$<br>$\diagdown$<br>NH, 192 g<br>$\diagup$<br>$HOC_2H_4$ | ...do... | Xylene, 500 g | 21–24 | 32 | 149 |
| 19b | 22a | 498 | $HOC_2H_4OC_2H_4OC_2H_4$<br>$\diagdown$<br>NH, 192 g<br>$\diagup$<br>$HOC_2H_4$ | ...do... | Xylene, 450 g | 22–25 | 32 | 153 |
| 20b | 23a | 542 | $CH_3(OC_2H_4)_3$<br>$\diagdown$<br>NH, 206 g<br>$\diagup$<br>$HOC_2H_4$ | 30%, 100 g | Xylene, 500 g | 21–23 | 36 | 151 |
| 21b | 25a | 547 | $CH_3(OC_2H_4)_3$<br>$\diagdown$<br>NH, 206 g<br>$\diagup$<br>$HOC_2H_4$ | ...do... | ...do... | 25–30 | 34 | 148 |
| 22b | 2a | 441 | $CH_3(OC_2H_4)_3$<br>$\diagdown$<br>NH, 206 g<br>$\diagup$<br>$HOC_2H_4$ | ...do... | Xylene, 400 g | 22–23 | 31 | 146 |
| 23b | 26a | 595 | Decylethanolamine, 201 g | 37%, 81 g | Xylene, 500 g | 22–27 | 24 | 145 |
| 24b | 27a | 391 | Decylethanolamine, 100 g | 30%, 50 g | Xylene, 300 g | 21–25 | 26 | 147 |

As has been pointed out, what has been described previously is the condensate implying the 1:2:2 ratio as specified in co-pending application, Serial No. 288,743. Such material, which is the final reaction of the aforementioned co-pending application, may be employed as an intermediate for the production of the herein described more complex condensates. Needless to say, such condensates can be obtained without an intermediate step as noted previously and as will be illustrated subsequently. There has been a previous statement as to the possible composition of the intermediate. Needless to say, the present condensates employing different reactant ratios, as for example, an increased amount of the amine and an increased amount of formaldehyde, result in different ultimate products, at least in part.

Actually what resultants are obtained, or rather what cogeneric mixtures or resultants are obtained, is in part obscure. For purpose of illustration a dialkanolamine, such as diethanolamine, will be used but it is to be noted that a monohydroxylated amine, for instance, ethylethanolamine, could be used. Consider the simple situation where an intermediate amine condensate of the kind described and prepared in the manner specified previously, is reacted additionally with two moles of diethanolamine and two moles of formaldehyde, based on a mole of resin originally employed as a reactant in the intermediate manufacture. Obviously, one mole of formaldehyde could combine with two moles of diethanolamine, thus:

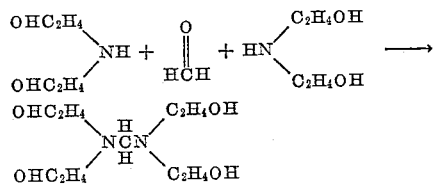

Furthermore, one mole of diethanolamine and one mole of formaldehyde could combine to form a cyclic compound, thus:

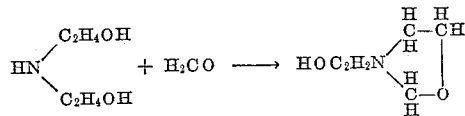

The compounds derived in the above manner may then react with an aryl radical, or with the residual amine radical in the intermediate. It has been suggested that under conditions as herein employed that reaction involves 2 phenolic hydroxyl hydrogen atoms. Actually, the phenolic hydroxyl hydrogen atoms are part of the resin molecule but the reaction might be shown simply thus:

This reaction appears very doubtful for the simple reason that the use of an alkaline catalyst in producing phenol-aldehyde resins from difunctional phenols rarely causes cross-linking. One would expect cross-linking and insolubilization if this reaction did take place to any significant degree. Another suggestion as to a possible reaction has been along the line that a phenolic hydroxyl (again as part of the resin molecule but here depicted as a single phenol) might react with monoethanolamine, thus:

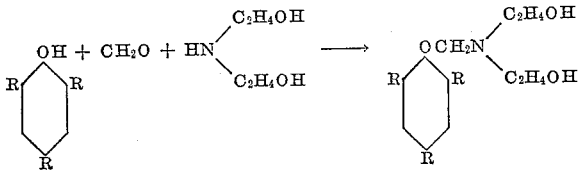

Still another suggestion has been reaction involving the meta group in the terminal phenol radical. This can be indicated in the following manner:

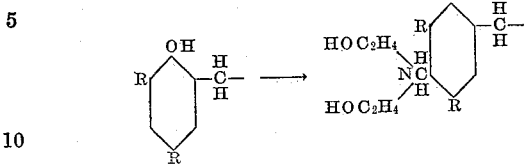

Another suggestion has been that chemical reactivity takes place in this particular manner but instead of involving a hydrogen in the meta position of a terminal phenol radical, there is involved instead a hydrogen atom which is part of a methylene bridge or the equivalent. This is not shown for the reason that it is comparable to the reaction previously suggested.

Still a different reaction has been suggested; that dehydration takes place at terminal ethanol groups forming a terminal unsaturated linkage and thus ultimately entering into a vinyl condensation, or the equivalent.

Another thought is one which, in a general way, is perfectly reasonable but any specific suggestion as to structure is obscure. The suggestion is of interest particularly since it may explain the elimination of formaldehyde in a subsequent stage of manufacture as referred to later. The idea briefly is nothing more than to the effect that formaldehyde may produce a divalent radical, thus:

which appears at some point between a nitrogen atom and a hydrogen atom, or between an oxygen atom and a hydrogen atom, or in some similar position to give a compound which is only partially heat-stable at the upper temperature range.

See chapter 12, Formaldehyde, Walker, 2nd ed., 1953, Reinhold Pub. Corp., N. Y.

Without attempting to explore the ultimate composition further it is obvious, in fact, that no further directions are really required for the reason that all one need do is employ the intermediates as described in Table II and add the designated amount of reactants and proceed as previously in approximately the same temperature range as before, generally speaking, 140° to 150° or 160° C. Note, however, that if desired a different amine can be used in the split-step procedure as, for example, one could start with diethanolamine and could complete the reaction in the second step by using diisopropanolamine; or one could start with diisopropanolamine and complete the second step by using ethylethanolamine; or one could start with dibutanolamine and complete the step using cyclohexanolamine. Furthermore, using the split step procedure, one can use an amine in which a phenyl group is directly joined to the amino nitrogen atom as in the case of phenylethanolamine, phenylpropanolamine, phenylbutanolamine, etc. Furthermore, an acyl radical may be part of the hydroxylated amine as, for example, acetyl ethanolamine, oleyl propanolamine, ethanolstearylamine. Apparently if the basicity is high enough due to the inherent basicity of the intermediate condensate, reaction will take place with amino compounds having hydroxyl groups and aminohydrogen atoms, even though in such case the basicity is comparatively low due to the presence of a negative group, such as a phenyl group or acyl radical directly attached to the amino nitrogen atom. Compounds may be employed having a sulfonamide group present.

The procedure employed is illustrated by the following examples:

*Example 1c*

The intermediate condensate employed was 1b. The particular sample represented a solution of approximately 1120 grams of the condensate and 700 grams of xylene. To this there were added 210 grams of diethanolamine and 162 grams of 37% formaldehyde. The mixture was stirred for approximately two hours at approximately room temperature, for instance 20° to 35° C., and then refluxed for 4 hours at a temperature in the neighborhood of the boiling point of water or somewhat higher. A phase-separating trap was then set to eliminate water of solution from aqueous formaldehyde and also water of formation and the temperature allowed to rise to approximately 135° C. During this stage some xylene was removed so as to allow the temperature to rise to 150° C. or thereabouts and refluxing continued for a total of 6 hours in this upper range, i. e., 145–160° C. In any event, refluxing was continued for at least 2 hours after there was no further water draw-off. At the end of this period any xylene which had been distilled off was returned to the mixture. In some instances some xylene or other solvent was added, either at the start of the finish of the second step. This was purely a matter of convenience. Stirring was employed throughout but at the end of the condensation step the entire mixture was homogeneous and stirring was merely a matter of convenience for ease of continuing the reaction and controlling even distillation. The final condensate on a solvent-free basis was approximately 1400 grams.

As has been pointed out previously, for one mole of resin used initially there are employed at least three moles of formaldehyde and three moles of the hydroxylated secondary amine, i. e., at least one mole more of formaldehyde and at least one mole more of amine and specified as the basis of reaction in the formula mentioned in co-pending application, Serial No. 288,743. As a matter of fact, our preferred ratio is approximately 1:3.5:3.5, or at the most 1:4:4.

Stated another way, if one starts with the intermediate condensate as described in Table II, preceding, there is added a minimum of about 1.5 moles amine and 1.5 moles more formaldehyde and in some cases 2 moles more of each one, than in the preparation of condensates of the kind described in my aforementioned application, Serial No. 288,743.

The reaction, regardless of how conducted, that is, whether it goes through an intermediate condensation or not, is continued until there is no more evolution of water and for some time beyond, for instance, one or two hours. During this last stage there is usually a continued evolution of formaldehyde. In the early stages, formaldehyde that is evolved is unquestionably uncombined formaldehyde which is not soluble in the reaction mass or at least formaldehyde which is evolved during the stage that the reaction mass is not homogeneous. Secondly, there seems to be a continuation of formaldehyde evolution during the stage where the reaction mass is homogeneous but there is still water of solution present or at least water is being formed.

There then appears to be a third stage in which some formaldehyde is evolved and it may be formaldehyde being evolved from a type of compound which is stable at the low temperatures but not stable at the higher temperatures, for instance, 130°, 140° or 150°. Finally, there seems to be a slow evolution of formaldehyde as long as the operation is continued especially at the maximum temperature. If the formaldehyde forms a stable compound, or compounds, there seems to be a break up at a slow rate in the final stages in most instances. This simply means the weight of the final product is generally less than the weight would be if all the formaldehyde combined chemically. This is shown in the tabular data in Table III. If there were a definite point where evolution of formaldehyde ceased it might throw some light on the possible structure of mixture of compounds obtained. There is no doubt that in a number of instances where perhaps 3.5 or 4 moles of formaldehyde are employed the amount combined chemically at the end of the reaction period may not be in excess of 2.5 or in any event less than 3. This point is emphasized merely to the extent that it is an explanation of what appears in Table III.

In the table the value for the final product on a solvent-free basis is determined by taking a small sample and evaporating in vacuum so as to eliminate the xylene. No effort was made to eliminate the xylene from the reaction mass for the simple reason that it was most advantageous to keep it as a solution. The residual product was examined for color and there might have been a further loss of formaldehyde during this small-scale evaporation stage. Furthermore, there might also be a trace of xylene remaining behind. In other words, the final figures for the completed condensate product are values which are as close as can be determined for reasonable accuracy but may be subject to some variation.

TABLE III

| Complete condensate, Ex. No. | Intermediate condensate, Ex. No. | Amt. solvent free basis, grams | Solvent (xylene), grams | Secondary amine compound | Amt. Amine compound, grams | 37% formaldehyde, grams | Added solvent if any (xylene), grams | Reflux period (hrs.) | Reaction period after water take-off (hrs.) | Maximum distillation temp., °C. | Amt. of final condensate (solvent-free basis), grams |
|---|---|---|---|---|---|---|---|---|---|---|---|
| 1c | 1b | 1,120 | 700 | Diethanolamine | 210 | 162 | None | 6 | 2 | 160 | 1,420 |
| 2c | 2b | 1,230 | 1,000 | ---do--- | 210 | 162 | 100 | 6 | 2 | 155 | 1,530 |
| 3c | 3b | 1,545 | 1,100 | ---do--- | 210 | 243 | 200 | 5 | 3 | 153 | 1,800 |
| 4c | 4b | 1,165 | 900 | Diisopropanolamine | 265 | 162 | | 5.5 | 2.5 | 162 | 1,440 |
| 5c | 5b | 1,275 | 900 | ---do--- | 265 | 162 | | 5 | 2.75 | 145 | 1,550 |
| 6c | 6b | 1,590 | 1,000 | ---do--- | 265 | 243 | 100 | 6 | 3 | 147 | 1,865 |
| 7c | 1b | 1,120 | 700 | ---do--- | 265 | 162 | | 7 | 3 | 155 | 1,400 |
| 8c | 2b | 1,230 | 1,000 | ---do--- | 265 | 162 | | 7 | 4 | 157 | 1,500 |
| 9c | 4b | 1,165 | 800 | Ethylethanolamine | 210 | 162 | | 6 | 2 | 160 | 1,395 |
| 10c | 5b | 1,275 | 950 | ---do--- | 210 | 162 | 100 | 4.75 | 2 | 163 | 1,599 |
| 11c | 1b | 1,120 | 700 | Diethanolamine | 157 | 122 | 100 | 5 | 2¼ | 160 | 1,350 |
| 12c | 2b | 1,230 | 1,000 | ---do--- | 157 | 122 | | 5 | 3 | 162 | 1,445 |
| 13c | 4b | 1,160 | 900 | Dipropanolamine | 200 | 122 | 100 | 6 | 3 | 154 | 1,430 |
| 14c | 5b | 1,280 | 900 | ---do--- | 200 | 122 | 100 | 6 | 3 | 151 | 1,465 |

*Example 1d*

This is merely an example illustrating the procedure employed which is identical with that used in the manufacture of Example 1b but in which the amount of reactants employed at the very start are identical with those employed in both steps of 1c. Stated another way, as far as one can determine, the ultimate composition of 1b is the same as that of 1c. The resin used was phenol-aldehyde resin 2a, and the amount used was 882 grams. The amount of xylene used was 800 grams and the amount of diethanolamine was just twice that used in Example 1b, to wit, 420 grams, and the amount of formaldehyde (37% solution) was just twice that used in Example 1b, to wit, 324 grams. The various time periods were substantially the same as in 1b, and the temperatures at various stages the same as in 1b. The product obtained at the end of the reaction, for all practical purposes, seemed to be the same as in 1c. The yield was substantially the same as the yield of 1c, to wit, 1415 grams on a solvent-free basis.

*Example 1e*

This is simply a further alternate procedure which can be employed. The procedure which can be employed. The procedure is the same as in 1c, to wit, the same amount of intermediate condensate 1b is employed, to wit, 1120 grams on a solvent-free basis. 600 grams of solvent were used. However, the additional amine employed, and formaldehyde employed, were reacted separately and then added to intermediate resin 1b. 210 grams of diethanolamine were reacted with 162 grams of 37% formaldehyde in a separate vessel by simply stirring at room temperature (20° to 35° C.) for six hours. The next step consisted in refluxing for 2 hours. Prior to the reflux stage 200 grams of xylene were added. After 2 hours refluxing a phase-separating trap was employed to start the elimination of water. During this stage not only was water eliminated but also uncombined formaldehyde. After the water was entirely eliminated, some solvent was removed until the temperature rose to about the range of 145° to 155° C. The reaction was continued at this temperature for about 3½ hours more. The mass was then transferred and mixed with the intermediate 1b, previously described (1120 grams of intermediate condensate and 700 grams of xylene) in another vessel. 162 grams of formaldehyde (37% solution) were added and from this point forward the reaction was handled in the same manner as 1c. The final product appeared to be identical, as far as physical appearance goes, with 1c or 1b.

Previous reference has been made to the color of intermediate 1b. Actually, color and consistency of all the products prepared are much the same, to wit, varying from red to red-amber to dark red or almost blackish red. In each case the product obtained was softer than the original resin, in fact, represented either a semi-viscous or viscous liquid. In some instances the viscosity of the liquid was extremely high. Actually, there is no advantage in decolorization particularly for the purpose herein described. If desired, the product could be decolorized by using filtering clays, chars, or the like, in the same manner as noted in connection with 1b.

PART 4

As to the use of conventional demulsifying agents, reference is made to U. S. Patent No. 2,626,929, dated January 7, 1953, to De Groote, and particularly to Part 3. Everything that appears therein applies with equal force and effect to the instant process, noting only that where reference is made to Example 13b in said text beginning in column 15 and ending in column 18, reference should be to Example 5c, herein described.

Having thus described my invention, what I claim as new and desire to secure by Letters Patent is:

1. A process for breaking petroleum emulsions of the water-in-oil type characterized by subjecting the emulsion to the action of a demulsifier; said demulsifier being the product obtained by the process of condensing (a) an oxyalkylation-susceptible, fusible, non-oxygenated organic solvent-soluble, water-insoluble, low-stage phenol-aldehyde resin having an average molecular weight corresponding to at least 3 and not over 6 phenolic nuclei per resin molecule; said resin being difunctional only in regard to methylol-forming reactivity; said resin being derived by reaction between a difunctional monohydric phenol and an aldehyde having not over 8 carbon atoms and reactive toward said phenol, said resin being formed in the substantial absence of trifunctional phenols; said phenol being of the formula

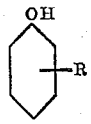

in which R is an aliphatic hydrocarbon radical having at least 4 and not more than 24 carbon atoms and substituted in the 2, 4, 6 position; (b) a basic hydroxylated secondary monoamine having not more than 32 carbon atoms in any group attached to the amino nitrogen atom, and (c) formaldehyde; said condensation reaction being conducted at a temperature sufficiently high to eliminate water and below the pyrolytic point of the reactants and resultants of reaction; with the proviso that the condensation reaction be conducted so as to produce a significant portion of the resultant in which each of the three reactants have contributed part of the ultimate molecule by virtue of a formaldehyde-derived methylene bridge connecting the amino nitrogen atom with a resin molecule; with the further proviso that the ratio of reactants be approximately 1:3:3 to 1:4:4, respectively, and with the final proviso that the resinous condensation product resulting from the process be organic solvent-soluble.

2. A process for breaking petroleum emulsions of the water-in-oil type characterized by subjecting the emulsion to the action of a demulsifier; said demulsifier being the product obtained by the process of condensing (a) an oxyalkylation-susceptible, fusible, nonoxygenated organic solvent-soluble, water-insoluble, low-stage phenol-aldehyde resin having an average molecular weight corresponding to at least 3 and not over 6 phenolic nuclei per resin molecule; said resin being difunctional only in regard to methylol-forming reactivity; said resin being derived by reaction between a difunctional monohydric phenol and an aldehyde having not over 8 carbon atoms and reactive toward said phenol; said resin being formed in the substantial absence of trifunctional phenols; said phenol being of the formula

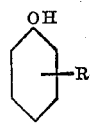

in which R is an aliphatic hydrocarbon radical having at least 4 and not more than 24 carbon atoms and substituted in the 2,4,6 position; (b) a basic hydroxylated secondary monoamine having not more than 32 carbon atoms in any group attached to the amino nitrogen atom, and (c) formaldehyde; said condensation reaction being conducted at a temperature sufficiently high to eliminate water and below the pyrolytic point of the reactants and resultants of reaction; with the proviso that the condensation reaction be conducted so as to produce a significant portion of the resultants in which each of the three reactants have contributed part of the ultimate molecule by virtue of a formaldehyde-derived methylene bridge connecting the amino nitrogen atom with a resin molecule; with the further proviso that the ratio of reactants be approximately 1:3:3 to 1:4:4, respectively; with the added proviso that the ratio of hydroxylated secondary monoamine to the resin molecule and the ratio of formaldehyde to the resin molecule, be identical; and with the final proviso that the resinous condensation product resulting from the process be organic solvent-soluble.

3. A process for breaking petroleum emulsions of the water-in-oil type characterized by subjecting the emulsion to the action of a demulsifier; said demulsifier being the product obtained by a two-step condensation process involving (A) the process of condensing (a) an oxyalkylation-susceptible, fusible, non-oxygenated organic solvent-soluble, water-insoluble, low-stage phenol-aldehyde resin having an average molecular weight corresponding to at least 3 and not over 6 phenolic nuclei per resin molecule; said resin being difunctional only in regard to methylol-forming reactivity; said resin being derived by reaction between a difunctional monohydric phenol and an aldehyde having not over 8 carbon atoms and reactive toward said phenol; said resin being formed in the substantial absence of trifunctional phenols; said phenol being of the formula

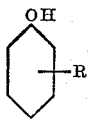

in which R is an aliphatic hydrocarbon radical having at least 4 and not more than 24 carbon atoms and substituted in the 2,4,6 position; (b) a basic hydroxylated secondary monoamine having not more than 32 carbon atoms in any group attached to the amino nitrogen atom, and (c) formaldehyde; said condensation reaction being conducted at a temperature sufficiently high to eliminate water and below the pyrolytic point of the reactants and resultants of reaction; with the proviso that the condensation reaction be conducted so as to produce a significant portion of the resultant in which each of the three reactants have contributed part of the ultimate molecule by virtue of a formaldehyde-derived methylene bridge connecting the amino nitrogen atom with a resin molecule; with the further proviso that the ratio of reactants be approximately 1,2 and 2 respectively; and with the added proviso that the resinous condensation product resulting from the process be heat-stable and oxyalkylation-susceptible; followed by (B) a second step in which there is introduced additionally 1 to 2 moles of a hydroxylated monoamine and 1 to 2 moles of formaldehyde calculated on the basis of the original resin molecule to the aforementioned condensate intermediate and then resuming condensation until reaction ceases, and with the final proviso that the product of reaction be organic solvent-soluble.

4. The emulsion breaking process of claim 3 in which in the preparation of the demulsifier by the condensation process the amine used in the second step is the same amine as the one used in the first step.

5. The emulsion breaking process of claim 3 in which in the preparation of the demulsifier by the condensation process the amine used in the second step is the same amine as the one used in the first step and the ratio of hydroxylated secondary amine to intermediate condensate and ratio of formaldehyde to intermediate condensate is identical.

6. The emulsion breaking process of claim 3 in which in the preparation of the demulsifier by the condensation process the amine used in the second step is the same amine as the one used in the first step and the ratio of hydroxylated secondary amine to intermediate condensate is 1.5 to 1, and the ratio of formaldehyde to intermediate condensate is 1.5 to 1.

7. A process for breaking petroleum emulsions of the water-in-oil type characterized by subjecting the emulsion to the action of a demulsifier; said demulsifier being the product obtained by a two-step condensation process involving (A) the process of condensing (a) an oxyalkylation-susceptible, fusible, non-oxygenated organic solvent-soluble, water-insoluble, low-stage phenol-aldehyde resin having an average molecular weight corresponding to at least 3 and not over 6 phenolic nuclei per resin molecule; said resin being difunctional only in regard to methylol-forming reactivity; said resin being derived by reaction between a difunctional monohydric phenol and an aldehyde having not over 8 carbon atoms and reactive toward said phenol; said resin being formed in the substantial absence of trifunctional phenols; said phenol being of the formula

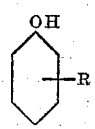

in which R is an aliphatic hydrocarbon radical having at least 4 and not more than 24 carbon atoms and substituted in the 2,4,6 position; (b) a dialkanolamine, and (c) formaldehyde; said condensation reaction being conducted at a temperature sufficiently high to eliminate water and below the pyrolytic point of the reactants and resultants of reaction; with the proviso that the condensation reaction be conducted so as to produce a significant portion of the resultant in which each of the three reactants have contributed part of the ultimate molecule by virtue of a formaldehyde-derived methylene bridge connecting the amino nitrogen atom with a resin molecule; with the further proviso that the ratio of reactants be approximately 1,2 and 2 respectively; and with the added proviso that the resinous condensation product resulting from the process be heat-stable and oxyalkylation-susceptible, followed by (B) a second step in which there is introduced additionally 1.5 moles of the same dialkanolamine used in the first condensation step, and 1.5 moles of formaldehyde, followed by resumption of condensation until reaction ceases, and with the final proviso that the product of reaction be organic solvent-soluble.

8. The emulsion breaking process of claim 7 in which in the preparation of the demulsifier by the condensation process the dialkanolamine is diethanolamine.

9. The emulsion breaking process of claim 7 in which in the preparation of the demulsifier by the condensation process the dialkanolamine is dipropylamine.

10. The emulsion breaking process of claim 7 in which in the preparation of the demulsifier by the condensation process the dialkanolamine is dibutanolamine.

References Cited in the file of this patent

UNITED STATES PATENTS

| 2,098,869 | Harmon et al. | Nov. 9, 1937 |
| 2,191,943 | Russell et al. | Feb. 27, 1940 |
| 2,457,634 | Bond et al. | Dec. 28, 1948 |
| 2,589,198 | Monson | Mar. 11, 1952 |
| 2,679,484 | De Groote | May 25, 1954 |
| 2,679,485 | De Groote | May 25, 1954 |